(12) United States Patent
Hsiung et al.

(10) Patent No.: US 7,883,213 B2
(45) Date of Patent: Feb. 8, 2011

(54) LIQUID CRYSTAL PROJECTION SYSTEM

(75) Inventors: Chien-Chih Hsiung, Taipei (CN);
Keng-Hui Lin, Taipei (CN); Tsi-Lung Wu, Taipei (CN); Wen-Lang Hung, Taipei (CN)

(73) Assignee: Asia Optical Co., Inc, Taichung (TW)

( * ) Notice: Subject to any disclaimer, the term of this patent is extended or adjusted under 35 U.S.C. 154(b) by 876 days.

(21) Appl. No.: 11/756,472

(22) Filed: May 31, 2007

(65) Prior Publication Data
US 2007/0285622 A1 Dec. 13, 2007

(30) Foreign Application Priority Data
Jun. 12, 2006 (TW) .............................. 95120813 A

(51) Int. Cl.
*G03B 21/14* (2006.01)
(52) U.S. Cl. ............................. 353/20; 353/33; 353/81
(58) Field of Classification Search ................... 353/30, 353/33, 34, 37, 81, 20
See application file for complete search history.

(56) References Cited

U.S. PATENT DOCUMENTS

| | | | |
|---|---|---|---|
| 6,247,814 B1 * | 6/2001 | Lin | ............................. 353/20 |
| 6,454,416 B2 | 9/2002 | Aoto et al. | |
| 6,819,497 B2 | 11/2004 | Suzuki et al. | |
| 7,002,752 B2 | 2/2006 | Chen et al. | |
| 2007/0285622 A1 * | 12/2007 | Hsiung et al. | .................. 353/20 |
| 2008/0036970 A1 * | 2/2008 | Hsiung et al. | .................. 353/20 |
| 2008/0180638 A1 * | 7/2008 | Hsiung et al. | .................. 353/20 |

* cited by examiner

*Primary Examiner*—John R Lee

(57) ABSTRACT

A liquid crystal projection system (70) includes a light source (50) for emitting a white light beam of three primary colors, a polarizer (51) for polarizing the white light beam, a separating mirror (52), first and second reflecting mirrors (53, 54), first and second polarization separators (56, 57), a half-wave plate (55), a color separator (58), image modulation devices (60R, 60G, 60B) and a projection lens (59). The separating mirror splits the incident polarized white light beam into two sets of polarized light beams, a monochromatic light beam and a bichromatic light beam that are respectively output to the first and second reflecting mirrors (53, 54). The polarized monochromatic light beam is reflected by the first reflecting mirror, transformed to a light beam with reversed polarization by the half-wave plate, and output to the first polarization separator. The polarized bichromatic light beam is reflected by the second reflecting mirror to the second polarization separator for polarization splitting, and then transmitted to the color separator for separating the two primary colors. The image modulation devices are arranged on sides of the first polarization separator and the color separator for respectively transforming and modulating the incident monochromatic and bichromatic light beams. The projection lens is disposed on one side of the second polarization separator.

21 Claims, 7 Drawing Sheets

LIQUID CRYSTAL PROJECTION SYSTEM

BACKGROUND OF THE INVENTION

1. Field of the Invention

The present invention relates to a liquid crystal projection system, and in particular to a liquid crystal projection system that utilizes three reflection type liquid crystal panels for image projection output.

2. Description of Prior Art

Because conventional CRT (Cathode Ray Tube) displays are limited by their size and cost, it is difficult for them to obtain a large display. The emergence of liquid crystal protection technologies makes it possible to obtain compact display while ensuring the same display effect as that of a CRT display.

A liquid crystal projector can be classified into a single-panel type and a three-panel type by the number of liquid crystal panels to be used. A single-panel projector is low in resolution and brightness, but is economic in cost. A three-panel projector has the advantages of high resolution and high brightness, but is expensive in cost. The working principle for a three-panel projector is to separate a white light from a light source into three primary color lights of red (R), green (G) and blue (B), then guide the three primary color lights to enter into respective red-color, green-color and blue-color liquid crystal display panels, recombine the three primary color lights reflected from the respective liquid crystal display panels, and finally project them onto a screen via a projection lens.

FIG. 1 illustrates the configuration of a conventional three-panel liquid crystal projection system that is disclosed in U.S. Pat. No. 6,454,416. Such a conventional liquid crystal projection system includes a separating mirror 11, a color selective polarizer 12, a first PBS (Polarization Beam Splitter) 15, a second PBS 17 and a dichroic prism 18. The separating mirror 11 reflects a first primary-color light Bs and transmits second and third primary color lights Rs, Gs from a light source 10. The color-selective polarizer 12 transmits the second primary-color light Rs from the separating mirror 11 with its polarization rotated by 90° to become Rp, and directly transmits the third primary-color light Gs. The first PBS 15 transmits the second primary-color light Rp from the color selective polarizer 12 to a first liquid crystal panel 13, and reflects the third primary-color light Gs from the color selective polarizer 12 to a second liquid crystal panel 14. The second PBS 17 reflects the first primary color light Bs from the separating mirror 11 to a third liquid crystal panel 16. The dichroic prism 18 combines the first, second and third primary-color lights reflected from the respective liquid crystal panels 13, 14, 16 for projection onto a screen via a projection lens. A color selective polarizer 19 is further provided between the first PBS 15 and the dichroic prism 18, and a wave plate or a glass plate 20 is further provided between the second PBS 17 and the dichroic prism 18. Both the color selective polarizer 19 and the wave plate or glass plate 20 are adapted to rotate the polarization of a corresponding incident primary-color light by 90°. Therefore, the polarizations of the three primary color lights that finally enter the dichroic prism 18 become Gp, Rp and Bs. In order to reduce reflection in the light path, the color selective polarizer 12, the first PBS 15, the color selective polarizer 19, the dichroic prism 18, the wave plate or glass plate 20 and the second PBS 17 are cemented together as a unit.

However, in the above conventional three-panel liquid crystal projection system, additional optical elements, i.e., the color selective polarizer 19 and the wave plate or glass plate 20, are further required to be disposed between the dichroic prism 18 and the PBS 15 or 17 so as to achieve the light polarization and separation functions. This decreases the cementing reliability of the prisms 15, 17, 18 and thus results in poor yield and high cost. It is well known that, in a liquid crystal projection system, in order to make the images formed on the three liquid crystal display panels to correctly overlap with each other, each component prism must be made reliable, which mostly depends on the cementing technology for prism. Therefore, any defects in the prism assembly, whether caused by the assembly method or the reliability of an individual prism, will bring deterioration to the entire system and thus adversely affect the image quality.

In addition, the increase of system cementing interfaces will decrease the display contrast and hence adversely affect the image quality. This is because the light absorption of the prisms during work will result in temperature rise, whereby stress occurs at the cementing interface and thus the display contrast is decreased.

FIG. 2 illustrates the configuration of another conventional three-panel liquid crystal projection system that is disclosed in U.S. Pat. No. 7,002,752. This conventional liquid crystal projection system includes three PBSs 21, 22, 23. In order to change the polarization of the incident primary color lights, a color selective polarizer 24 is further provided between the two opposite PBSs 21, 22, and a wave plate 25 is further provided between the two opposite PBSs 22, 23. Consequently, the cementing reliability of the PBSs 21, 22, 23 is also decreased, which correspondingly decreases the contrast of the projection image. In addition, a plurality of polarizers 26, 27 is further provided on one side of the PBS 21 or 23. This increases the number of system components, complicates the system assembly and increases the cost.

The configuration of a further conventional three-panel liquid crystal projection system, which is disclosed in U.S. Pat. No. 6,819,497, is illustrated in FIG. 3. This conventional liquid crystal projection system includes four PBSs 31, 32, 33, 34, which increases the number of system components, the system volume and the cost. Specifically, the PBSs 32, 33, 34 are cemented together as a unit. However, a glass plate 35 is further disposed between the PBSs 32, 34, and a color selective polarizer 38 is further disposed between the PBSs 33, 34. This also decreases the cementing reliability of the PBSs 32, 33, 34.

Further, in the above conventional projection system, the three primary color lights Rs, Gs, Bs emitted from a light source 36 are transformed into Rs, Gp, Bs after passing through a color selective polarizer 37 and then incident into the first PBS 31. Two primary color lights Rs, Bs are reflected by the first PBS 31, transformed into Rp, Bs by a color selective polarizer 30, and incident into the third PBS 33. The primary color light Gp is transmitted through the first PBS 31 and then incident into the second PBS 32. The color light Rp is transmitted through the third PBS 33, incident into a reflective liquid crystal panel 39R, and returns to the third PBS 33 as an S-polarization light Rs after transformation and modulation by the reflective liquid crystal panel 39R. The color light Rs is then reflected by the third PBS 33, transformed into a P-polarization light Rp by a color selective polarizer 38, and incident into the fourth PBS 34. The color light Bs is reflected into a reflective liquid crystal panel 39B by the third PBS 33, and then returns to the third PBS 33 as a P-polarization light Bp after transformation and modulation by the reflective liquid crystal panel 39B. The color light Bp is then transmitted through the third PBS 33 and incident into the fourth PBS 34. The color light Gp is transmitted through the second PBS 32, is incident into a reflective liquid crystal panel 39G, then returns to the second PBS 32 as an S-polarization light Gs after transformation and modulation by the reflective liquid crystal panel 390, and is finally incident into the fourth PBS 34 by reflection of the second PBS 32. Therefore, the primary color lights that are incident into the second, third and fourth PBSs 32, 33, 34 are Gp; Rp, Bs; and Rp, Bp, Gs, respectively. However, it is known that the utility efficiency of the S polarization light in a PBS is 99 percent, while the P polarization light is only 90 percent. The remaining unutilized 10 percent will cause the color phase shift problem due to light interference. Therefore, in the above conventional projection system, since the majority of primary color lights enter the second, third and fourth PBSs 32, 33, 34 in a P-polarization state rather than an S-polarization state, the utility efficiency of the primary color lights in this system is decreased and thus the color phase shift problem may occur.

Accordingly, an improved liquid crystal projection system is desired to overcome the problems as described above in connection with the prior art.

SUMMARY OF THE INVENTION

An object of the present invention is to provide a liquid crystal projection system that has no additional optical elements disposed between a dichroic prism and PBSs thereof, so as to increase the cementing reliability of the prisms.

Another object of the present invention is to provide a liquid crystal projection system that increases the utility efficiency of the primary color lights, prevents the color phase shift appearing on the projected image, and thus improves the image contrast.

A further object of the present invention is to provide a liquid crystal projection system that is simple in manufacture, easy in assembly and low in cost.

To achieve the above objects of the present invention, a liquid crystal projection system in accordance with the present invention includes a light source for emitting white light of three primary colors (red, green, blue; R, G, B), a polarizer for polarizing the white light so as to obtain a polarized light beam, a separating mirror, first and second reflecting mirrors, first and second polarization separators, a half-wave plate disposed on the input side of the first polarization separator, a color separator, image modulation devices and a projection lens for projecting the output light beam onto a screen. The separating mirror splits the incident polarized light beam into two sets of light beams, a polarized monochromatic light beam containing a single primary color and a polarized bichromatic light beam containing the other two primary colors. The polarized monochromatic light beam is sequentially reflected by the first reflecting mirror, transformed to a light beam with reversed polarization by the half-wave plate, and output to the first polarization separator for polarization second reflecting mirror, output to the second polarization separator for polarization splitting, and then transmitted to the color separator for separating the two primary colors. The image modulation devices are arranged on sides of the first polarization separator and the color separator for respectively receiving and modulating the monochromatic and bichromatic light beams. The polarizations of the monochromatic and bichromatic light beams are transformed by the image modulation devices before output. The projection lens is disposed on one side of the second polarization separator for receiving the modulated light beams and projecting the combined light beam to the screen for display.

The first polarization separator, the second polarization separator and the color separator are combined together as an L-shaped prism module with no additional optical elements arranged therebetween. The bichromatic light beam from the separating mirror is incident onto the second polarization separator and the color separator in an S-polarization state.

In comparison with the prior art, the present liquid crystal projection system only requires two polarization separators and one color separator to achieve the light polarization and separation functions. No additional optical element is further required to be arranged between the color separator and the polarization separators. Accordingly, the cementing reliability of the color separator and the polarization separators is significantly increased and thus the projection image contrast is improved. Further, in a preferred embodiment of the present liquid crystal projection system, both the red light R and the blue light B are incident onto the second polarization separator and the color separator in an S-polarization state. This increases the utility efficiency of the primary color lights from the light source and effectively decreases the likelihood that color phase shift occurs. In addition, the present liquid crystal projection system achieves the light polarization and separation functions by employing two polarization separators and one color separator that are cemented together as an L-shaped prism module with no additional optical elements arranged therebetween. This L-shaped prism module may be composed of six, five or even four conventional isosceles right-angle prisms. Therefore, the present liquid crystal projection system also has the advantages of simple manufacture, easy assembly and low cost.

BRIEF DESCRIPTION OF THE DRAWINGS

The present invention may best be understood through the following description with reference to the accompanying drawings, in which.

DETAILED DESCRIPTION OF THE PREFERRED EMBODIMENTS

Figure 1:
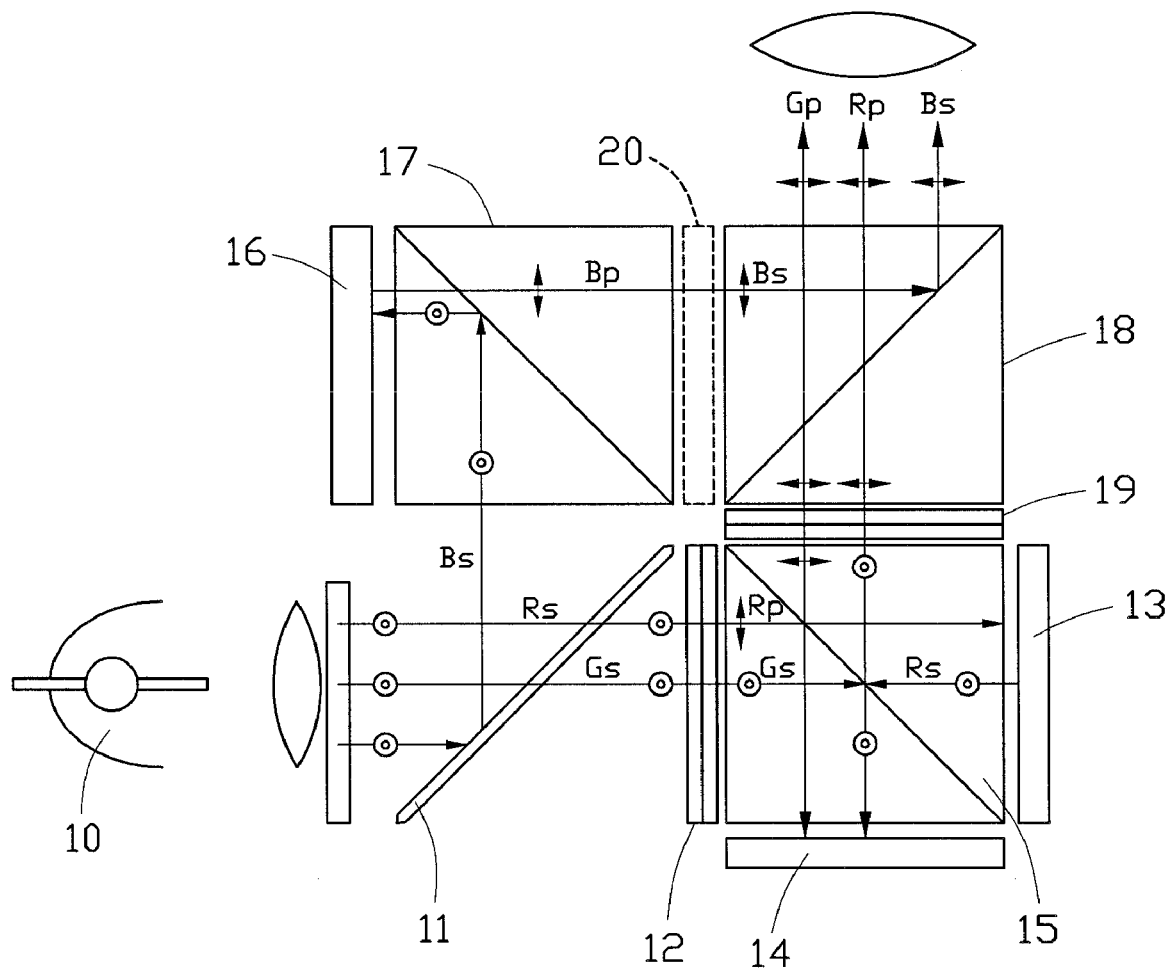
FIG. 1 is a schematic view illustrating the configuration of a conventional liquid crystal projection system.
Figure 2:
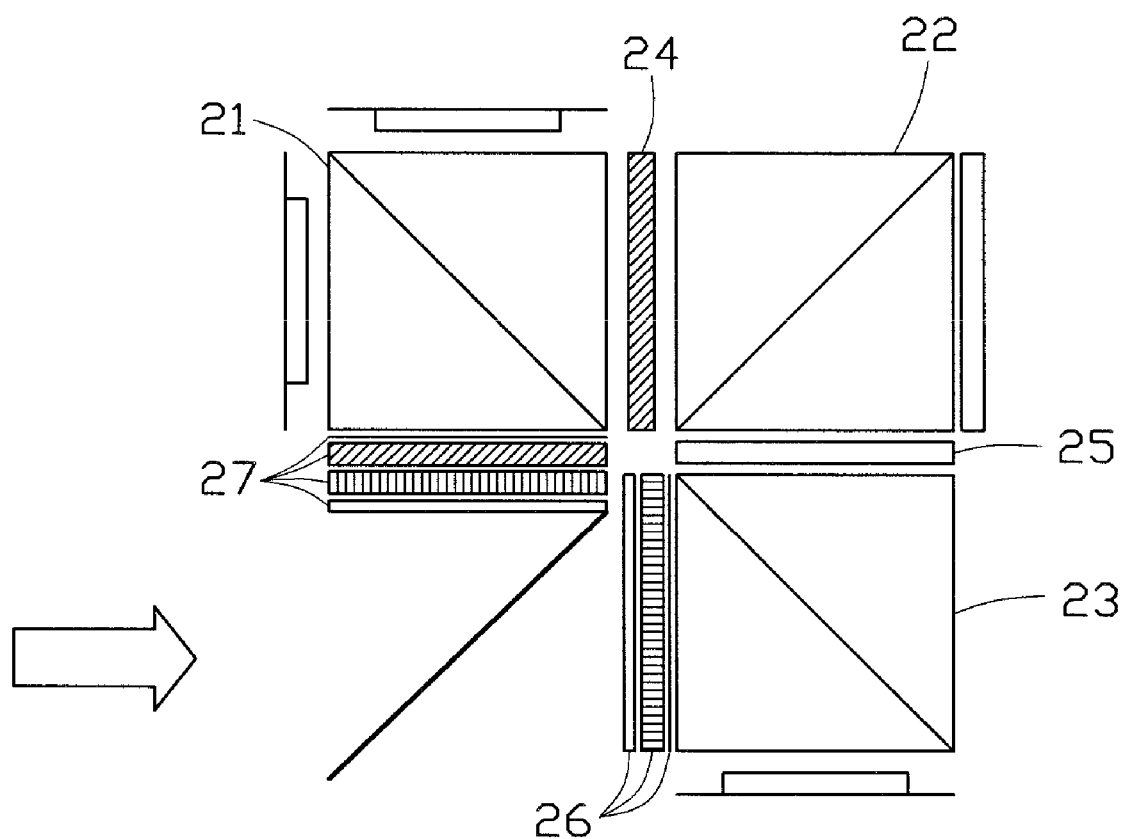
FIG. 2 is a schematic view illustrating the configuration of another conventional liquid crystal projection system.
Figure 3:
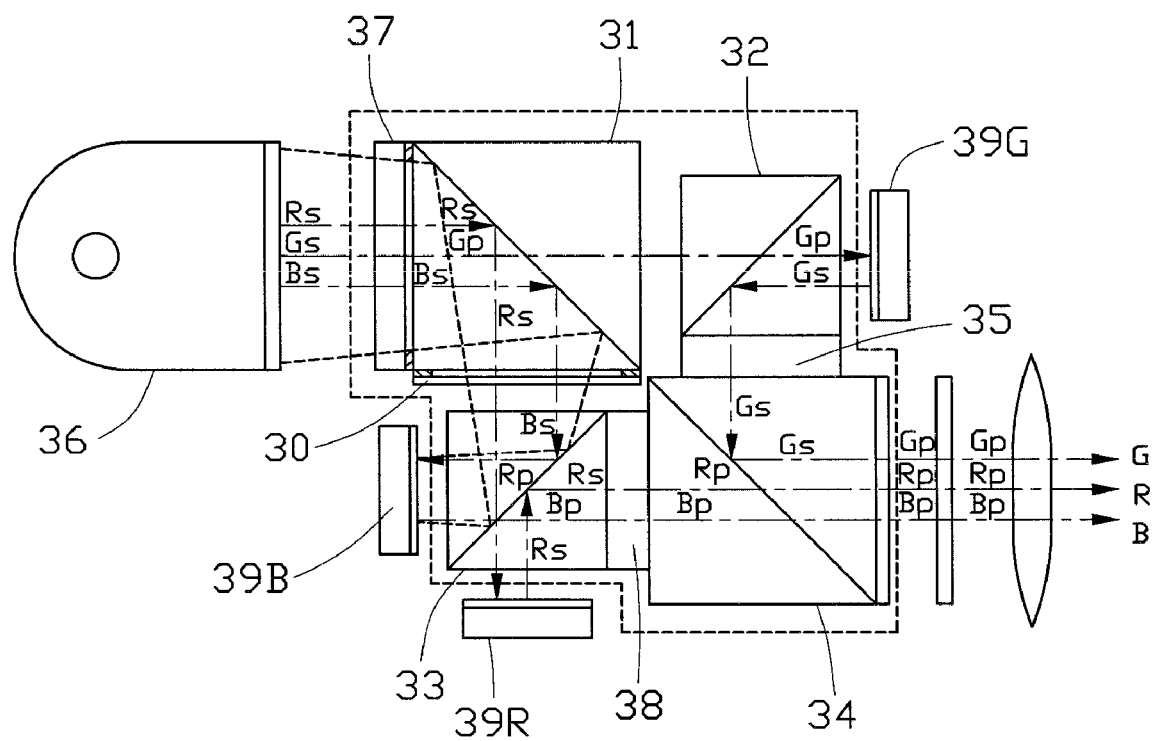
FIG. 3 is a schematic view illustrating the configuration of a further conventional liquid crystal projection system.
Figure 4:
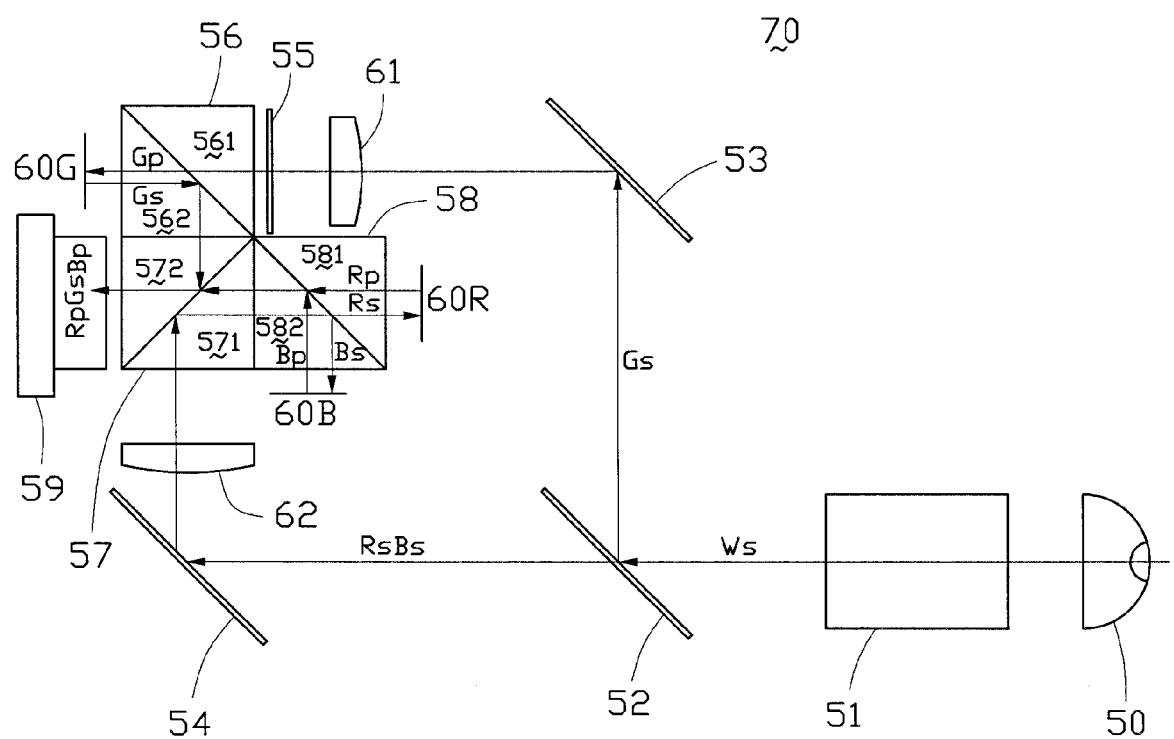
FIG. 4 is a schematic view illustrating the configuration of a liquid crystal projection system in accordance with the present invention.

Referring to FIG. 4, a liquid crystal projection system 70 in accordance with the concept of the present invention includes a light source 50 for emitting white light, a polarizer 51 for polarizing the white light so as to obtain a polarized light beam, a separating mirror 52 for providing separated light beams, first and second reflecting mirrors 53, 54 for light reflection, a half-wave plate 55 ($\lambda/2$ wave plate, $\lambda=632.8$ nm) for transforming the polarization of an incident light beam, first and second polarization separators 56, 57 for polarization splitting, a color separator 58, image modulation devices 60 for light modulation and transformation, and a projection lens 59 for projecting the output light beam onto a screen. The polarizer 51 is disposed on an output light path of the light source 50 for polarizing the non-polarized incident white light into a polarized white light beam Ws (S denotes a perpendicular polarization) of three primary colors (red, green, blue; R, G, B). The polarizer 51 and the light source 50 together constitute a polarized light source. Further, the present liquid crystal projection system 70 also includes first and second converging lenses 61, 62 for converging the incident light.

The separating mirror 52 and the second reflecting mirror 54 are positioned along a light output path of the polarizer 51. The separating mirror 52 is adapted to separate the polarized white light beam Ws of three primary colors R, G, B from the polarizer 51 into two sets of light beams, a polarized monochromatic light beam containing a single primary color and a polarized bichromatic light beam containing the other two primary colors. Preferably, the polarized monochromatic light beam contains the green color G, and the polarized bichromatic light beam contains the red and blue colors R, B. The monochromatic light beam Gs is reflected by the first reflecting mirror 53 positioned above the separating mirror 52, and the bichromatic light beam (Rs, Bs) is reflected by the second reflecting mirror 54 positioned on the left side of the separating mirror 52.

The first polarization separator 56, the second polarization separator 57 and the color separator 58 are combined together as an L-shaped prism module by cementing. The first polarization separator 56 is adapted to transmit or reflect the incident monochromatic light beam according to the polarization state (P-polarization or S-polarization) thereof. The second polarization separator 57, which is positioned right below the first polarization separator 56 and proximate to the projection lens 59, is adapted to transmit and/or reflect the incident bichromatic light beam according to the polarization states (P-polarization or S-polarization) of the two constitute primary colors thereof. The color separator 58 is positioned on one side of the second polarization separator 57, and is adapted to reflect one constitute primary color light of the incident bichromatic light beam and transmit the other constitute primary color light. The first polarization separator 56 is in the form of a PBS that is formed by cementing the bottom sides of two conventional isosceles right-angle prisms 561, 562. The second polarization separator 57 is also in the form of a PBS that is formed by cementing the bottom sides of two conventional isosceles right-angle prisms 571, 572. The color separator 58 is in the form of a dichroic prism that is also formed by cementing the bottom sides of two conventional isosceles right-angle prisms 581, 582.

The image modulation devices 60 are adapted to modulate the incident polarized light into a polarized light having a reversed polarization and carrying an image signal. The image modulation devices 60 include a first reflective liquid crystal panel 60G, a second reflective liquid crystal panel 60B and a third reflective liquid crystal panel 60R. The first reflective liquid crystal panel 60G is arranged on one side of the first polarization separator 56, and the second and third reflective liquid crystal panels 60B, 60R are arranged on two respective sides of the color separator 58. The projection lens 59 is disposed on one side of the second polarization separator 57 for projecting the modulated and transformed light beam from the image modulation devices 60 onto the screen for display.

The half-wave plate 55 is disposed on one side of the first polarization separator 56 for transforming the polarization of the incident light beam. The first converging lens 61 is arranged between the first reflecting mirror 53 and the half-wave plate 55, and the second converging lens 62 is arranged between the second reflecting mirror 54 and the second polarization separator 57. The employment of the two converging lenses 61, 62 is to converge the incident light beam and thus improve the light utility efficiency.

Figure 5:
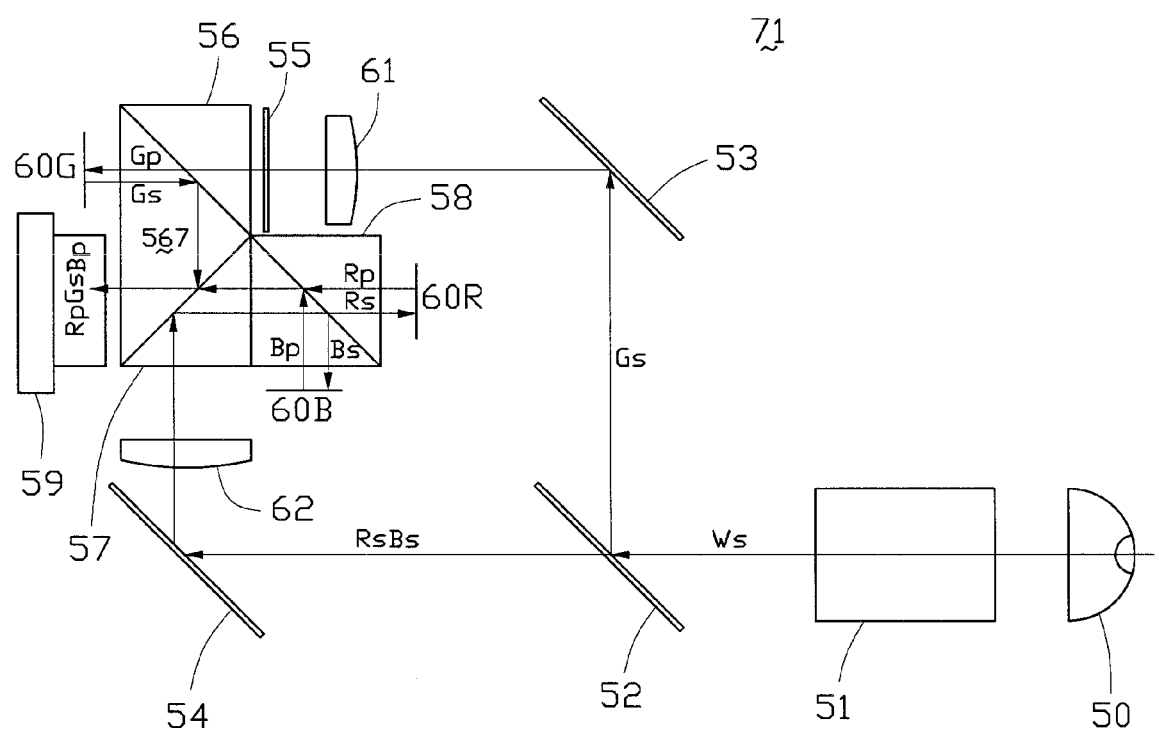
FIG. 5 is a schematic view illustrating the configuration of a liquid crystal projection system in accordance with a first embodiment of the present invention.
Figure 6:
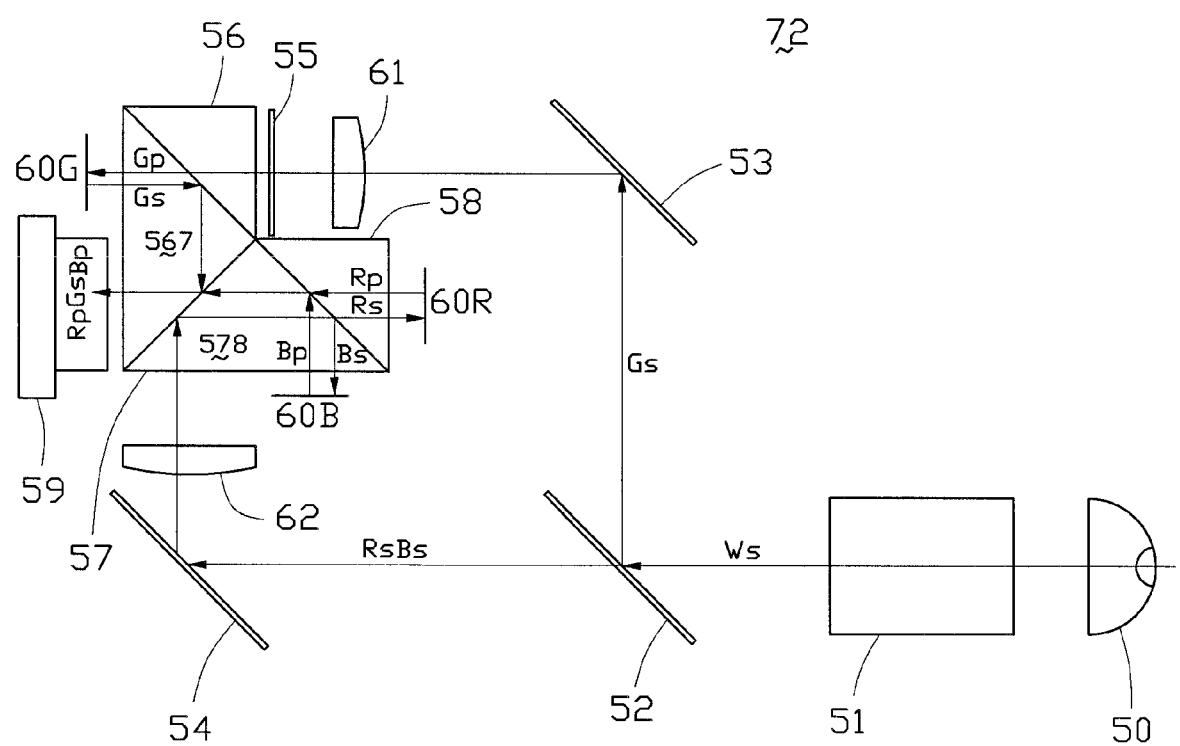
FIG. 6 is a schematic view illustrating the configuration of a liquid crystal projection system in accordance with a second embodiment of the present invention.
Figure 7:
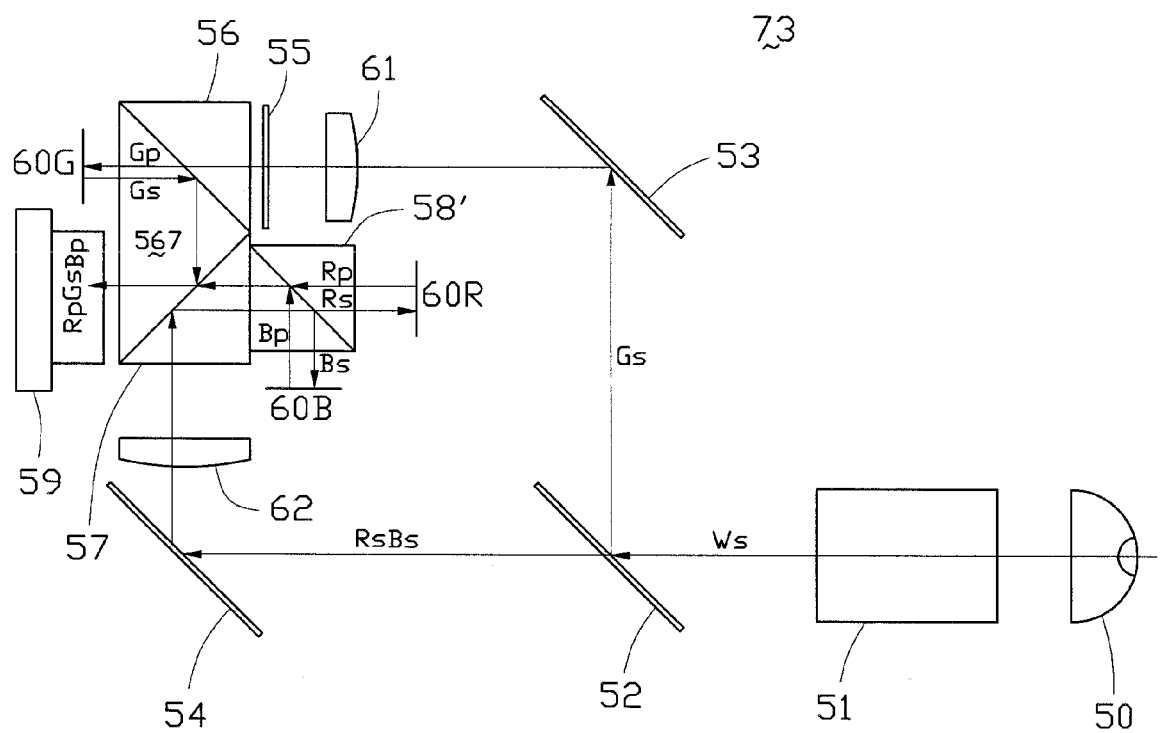
FIG. 7 is a schematic view illustrating the configuration of a liquid crystal projection system in accordance with a third embodiment of the present invention.

FIGS. 5-7 respectively illustrate a liquid crystal projection system in accordance with the first, second and third embodiments of the present invention.

FIG. 5 shows a liquid crystal projection system 71 in accordance with the first embodiment of the present invention. In this embodiment, the polarizer 51 outputs an S-polarized white light beam Ws of three primary colors R, G, B to the separating mirror 52. The separating mirror 52 separates the white light beam Ws into two sets of polarized light beams, a monochromatic light beam containing a single primary color and a bichromatic light beam containing the other two primary colors. Preferably, the monochromatic light beam contains the green color G, and the bichromatic light beam contains the red and blue colors R, B. The separating mirror 52 reflects the monochromatic light beam Gs to the first reflecting mirror 53 positioned thereabove, and transmits the bichromatic light beam (Rs, Bs) to the second reflecting mirror 54 positioned on the left side thereof. The green light beam Gs is reflected by the first reflecting mirror 53 to the first converging lens 61 for convergence onto the half-wave plate 55. The half-wave plate 55 transforms the S-polarized green light beam Gs into a P-polarized green light beam Gp before it is incident onto the first polarization separator 56. The first polarization separator 56, in the form of a PBS, is adapted to transmit P-polarized light and reflects S-polarized light. Therefore, the green light beam Gp from the half-wave plate 55 is transmitted by the first polarization separator 56 to the first reflective liquid crystal panel 60G. The first reflective liquid crystal panel 60G transforms the incident green light beam Gp into an S-polarized green light beam Gs, and modulates it into a green light beam Gs carrying green image signal. After transformation and modulation, the green light beam Gs is reflected by the first reflective liquid crystal panel 60G back to the first polarization separator 56, and is further reflected by the first polarization separator 56 into the second polarization separator 57. The bichromatic light beam (Rs, Bs) output by the separating mirror 52 is sequentially reflected by the second reflecting mirror 54, converged by the second converging lens 62 and incident into the second polarization separator 57. The second polarization separator 57 is also in the form of a PBS for transmitting P-polarized light and reflecting S-polarized light. Therefore, the bichromatic light beam (Rs, Bs) is reflected by the second polarization separator 57 into the color separator 58. The color separator 58, in the form of a bichromatic prism, is adapted to reflect blue light and transmit red light. Accordingly, the blue light Bs in the bichromatic light beam (Rs, Bs) is reflected by the color separator 58 to the second reflective liquid crystal panel 60B, while the red light Rs in the bichromatic light beam (Rs, Bs) is transmitted through the color separator 58 into the third reflective liquid crystal panel 60R. Consequently, the blue light Bs is transformed and modulated into a blue light beam Bp carrying blue image signal by the second reflective liquid crystal panel 60B, and the red light Rs is transformed and modulated into a red light beam Rp carrying red image signal by the third reflective liquid crystal panel 60R. The blue light beam Bp and red light beam Rp are then reflected back to the color separator 58 by the respective second and third reflective liquid crystal panels 60B, 60R. The color separator 58 respectively reflects and transmits the blue light beam Bp and red light beam Rp back into the second polarization separator 57. Further, the second polarization separator 57 transmits the incident blue and red light beams Bp, Rp from the color separator 58 to the projection lens 59, and reflects the incident green light beam Gs from the first polarization separator 56 to the projection lens 59. Finally, the projection lens 59 combines and projects the three primary color lights Bp, Rp, Gs carrying corresponding image signals onto the screen for image display.

In the first embodiment, the L-shaped prism module, consisting of the first polarization separator 56, the second polarization separator 57 and the color separator 58, is composed of five cemented isosceles right-angle prisms, not six isosceles right-angle prisms of the same size as in the basic system configuration in FIG. 4. Referring to FIG. 5 in combination with FIG. 4, in the first embodiment of FIG. 5, in order to reduce the prism manufacture and assembly costs, a larger-sized isosceles right-angle prism 567 replaces the two small-sized isosceles right-angle prisms 562, 572 in FIG. 4. The size of the larger-sized isosceles right-angle prism 567 is proximately equal to the combined size of the two small-sized isosceles right-angle prisms 562, 572.

Referring to FIG. 6 in combination with FIG. 5, in the second embodiment, in order to further minimize the prism manufacture and assembly costs, the L-shaped prism module is composed of only four cemented isosceles right-angle prisms, not five isosceles right-angle prisms as the first embodiment in FIG. 5. The two small isosceles right-angle prisms 571, 581 of the same size as in FIG. 5 is further replaced in this embodiment by a large isosceles right-angle prism 578 that has a size proximately equal to the combined size of the two small-sized isosceles right-angle prisms 571, 581 in FIG. 5.

Referring to FIG. 7 in combination with FIG. 5, in the third embodiment, a small-sized color separator 58', in the form of a dichroic prism, replaces the large-sized color separator 58 in the first embodiment of FIG. 5. This makes the configuration of the present liquid crystal projection system more compact.

As described above, the present liquid crystal projection system only requires two polarization separators 56, 57 (in the form of a PBS) and one color separator 58, 58' (in the form of a dichroic prism) to achieve the light polarization and separation functions with no additional optical elements disposed therebetween. Accordingly, the cementing reliability of the color separator 58, 58' and the polarization separators 56, 57 is significantly increased and consequently the projection image contrast is improved. Further, in a preferred embodiment of the present liquid crystal projection system, both the red light R and the blue light B are incident into the second polarization separator 57 and the color separator 58, 58' in an S-polarization state. This is because that the utility efficiency of the S polarization light in a PBS is 99 percent, while the P polarization light is only 90 percent. The remaining unutilized 10 percent will cause the color phase shift problem due to light interference. Accordingly, making two primary color lights (preferably R, B) of the incident white light enter the PBS in an S-polarization state may increase the utility efficiency of the incident white light, and effectively decrease the likelihood that color phase shift occurs. In addition, the present liquid crystal projection system achieves the light polarization and separation functions by employing two polarization separators 56, 57 and one color separator 58, 58' that are cemented together as an L-shaped prism module with no additional optical elements arranged therebetween. This L-shaped prism module may be composed of six, five or even four conventional isosceles right-angle prisms. Therefore, the present liquid crystal projection system also has the advantages of simple manufacture, easy assembly and low cost.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal projection system, comprising: a polarized light source providing a polarized white light beam of three primary colors; a separating element separating the polarized white light beam from the polarized light source into a monochromatic light beam containing one primary color of the three primary colors and a bichromatic light beam containing the remaining two primary colors of the three primary colors; a first reflecting element disposed on one output side of the separating element, the first reflecting element receiving and reflecting the monochromatic light beam from the separating element; a second reflecting element disposed on the other output side of the separating element, the second reflecting element receiving and reflecting the bichromatic light beam from the separating element; a half-wave plate transforming the polarization of an incident light beam from the first reflecting element; a first polarization separator disposed on the output side of the first reflecting element, the first polarization separator receiving and outputting the monochromatic light beam; a second polarization separator disposed on the output side of the second reflecting element, the second polarization separator receiving and polarization splitting the bichromatic light beam; a color separator disposed on one side of the second polarization separator, the color separator receiving and separating the bichromatic light beam; image modulation devices disposed on sides of the first polarization separator and the color separator, the image modulation devices transforming the polarizations of the monochromatic and bichromatic light beams and modulating the respective monochromatic and bichromatic light beams; and a projection lens disposed on one side of the second polarization separator, the projection lens projecting the transformed and modulated monochromatic and bichromatic light beams from the image modulation devices onto a screen for image display; wherein, the first polarization separator, the second polarization separator and the color separator are combined together as a unit with no additional optical elements disposed therebetween.

2. The liquid crystal projection system as claimed in claim 1 further comprising a first condensing lens and a second condensing lens, the first condensing lens being disposed between the first reflecting element and the first polarization separator, the second condensing lens being disposed between the second reflecting element and the second polarization separator.

3. The liquid crystal projection system as claimed in claim 1, wherein the half-wave plate is disposed between the first polarization separator and the first reflecting element.

4. The liquid crystal projection system as claimed in claim 1, wherein the first polarization separator, the second polarization separator and the color separator are combined together as an L-shaped unit.

5. The liquid crystal projection system as claimed in claim 1, wherein the first polarization separator is a polarization beam splitter.

6. The liquid crystal projection system as claimed in claim 5, wherein the second polarization separator is a polarization beam splitter.

7. The liquid crystal projection system as claimed in claim 6, wherein the color separator is a dichroic prism.

8. The liquid crystal projection system as claimed in claim 7, wherein the first polarization separator is formed by at least one prism, the second polarization separator is formed by at least one prism, the size of the color separator is smaller than that of the respective first and second polarization separators.

9. The liquid crystal projection system as claimed in claim 7, wherein the first polarization separator, the second polarization separator and the color separator are combined together as an L-shaped unit, the L-shaped unit being composed of six isosceles right-angle prisms cemented with each other.

10. The liquid crystal projection system as claimed in claim 7, wherein the first polarization separator, the second polarization separator and the color separator are combined together as an L-shaped unit, the L-shaped unit being composed of five isosceles right-angle prisms cemented with each other.

11. The liquid crystal projection system as claimed in claim 7, wherein the first polarization separator, the second polarization separator and the color separator are combined together as an L-shaped unit, the L-shaped unit being composed of four isosceles right-angle prisms cemented with each other.

12. The liquid crystal projection system as claimed in claim 1, wherein the image modulation devices comprise first, second and third reflective liquid crystal panels, the first reflective liquid crystal panel being arranged on one side of the first polarization separator, the second and third reflective liquid crystal panels being arranged on two respective sides of the color separator.

13. The liquid crystal projection system as claimed in claim 1, wherein the polarized light source consists of a white light source and a polarizer.

14. The liquid crystal projection system as claimed in claim 1, wherein the polarized light source is an S-polarized light source.

15. A liquid crystal projection system, comprising: a polarized light source providing a polarized white light beam of three primary colors; a separating element separating the polarized white light beam from the polarized light source into a monochromatic light beam containing one primary color of the three primary colors and a bichromatic light beam containing the remaining two primary colors of the three primary colors; a first reflecting element disposed on one output side of the separating element, the first reflecting element receiving and reflecting the monochromatic light beam from the separating element; a second reflecting element disposed on the other output side of the separating element, the second reflecting element receiving and reflecting the bichromatic light beam from the separating element; a half-wave plate transforming the polarization of an incident light beam from the first reflecting element; a first polarization separator disposed on the output side of the first reflecting element, the first polarization separator receiving and outputting the monochromatic light beam; a second polarization separator disposed on the output side of the second reflecting element, the second polarization separator receiving and polarization splitting the bichromatic light beam; a color separator disposed on one side of the second polarization separator, the color separator receiving and separating the bichromatic light beam; image modulation devices disposed on sides of the first polarization separator and the color separator, the image modulation devices transforming the polarizations of monochromatic and bichromatic light beams and modulating the respective monochromatic and bichromatic light beams; and a projection lens disposed on one side of the second polarization separator, the projection lens projecting the transformed and modulated monochromatic and bichromatic light beams from the image modulation devices onto a screen for image display; wherein, the first polarization separator, the second polarization separator and the color separator are combined together as an L-shaped unit, and the bichromatic light beam from the separating element is incident into the second polarization separator and the color separator in an S-polarization state.

16. The liquid crystal projection system as claimed in claim 15, wherein no additional optical element is disposed between the first polarization separator, the second polarization separator and the color separator.

17. The liquid crystal projection system as claimed in claim 15, wherein the half-wave plate is disposed between the first polarization separator and the first reflecting element.

18. The liquid crystal projection system as claimed in claim 17 further comprising a first condensing lens and a second condensing lens, the first condensing lens being disposed between the first reflecting element and the half-wave plate, the second condensing lens being disposed between the second reflecting element and the second polarization separator.

19. The liquid crystal projection system as claimed in claim 15, wherein each of the first and second polarization separators is in the form of a polarization beam splitter, and the color separator is in the form of a dichroic prism.

20. The liquid crystal projection system as claimed in claim 15, wherein the image modulation devices comprise first, second and third reflective liquid crystal panels, the first reflective liquid crystal panel being arranged on one side of the first polarization separator, the second and third reflective liquid crystal panels being arranged on two respective sides of the color separator.

21. The liquid crystal projection system as claimed in claim 15, wherein the polarized light source is an S-polarized light source, and consists of a white light source and a polarizer.

* * * * *